Figure 1:
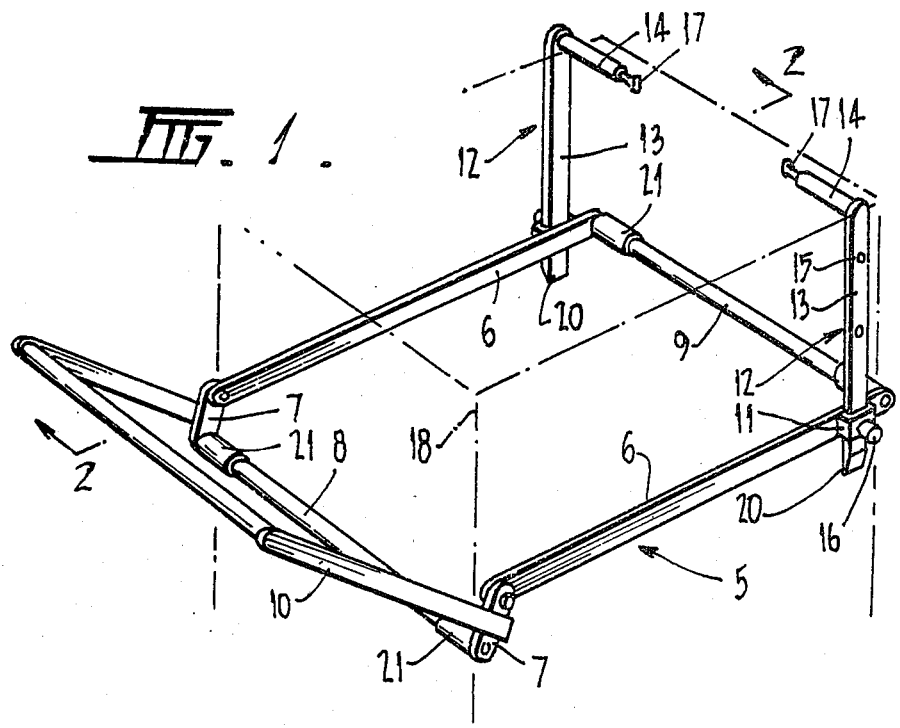

United States Patent [19]

Crichton et al.

[11] 4,395,788

[45] Aug. 2, 1983

[54] APPARATUS FOR SEPARATING BEEHIVE BOXES

[76] Inventors: Norman K. Crichton, 19 Vernal Rd., South Oakleigh, Victoria; Clive Farley-Smith, 76 Morey Rd., Beaumaris, Victoria, both of Australia

[21] Appl. No.: 420,815

[22] Filed: Sep. 21, 1982

[30] Foreign Application Priority Data

Oct. 9, 1981 [AU] Australia .............................. PF1128

[51] Int. Cl.³ ...................... A01K 59/00; A01K 51/00
[52] U.S. Cl. ...................................... 6/12 R; 254/113
[58] Field of Search ............. 6/12 R, 12 M; 294/27.1; 254/113, 124, 131

[56] References Cited

U.S. PATENT DOCUMENTS 775,691 11/1904 De Valdivielso ..................... 6/12 R
3,514,145 5/1970 Elgin et al. ......................... 294/19.1

FOREIGN PATENT DOCUMENTS 874,466 8/1961 United Kingdom ................ 254/113

Primary Examiner—Robert P. Swiatek
Attorney, Agent, or Firm—Frishauf, Holtz, Goodman and Woodward

[57] ABSTRACT

An apparatus for separating beehive boxes for removal of honey frames in the boxes. The apparatus includes a rectangular framework which fits over the beehive with one end of the framework engaging against an upper box in the hive at one end thereof and a pivotally mounted other end of the framework engaging against the next lower box in the hive at the other end thereof. The pivotally mounted framework end is provided with a handle which on actuation slides the top box over the lower box with a shearing action to break the seal between the boxes and allow removal of the top box.

9 Claims, 10 Drawing Figures

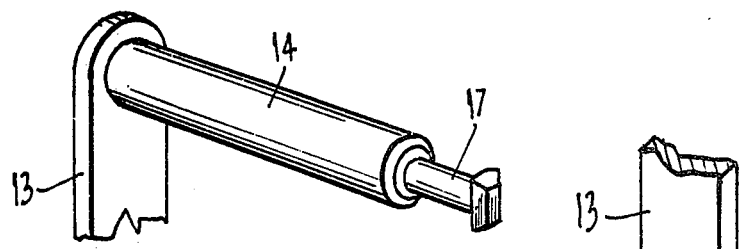
FIG. 6.
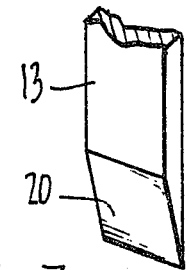
FIG. 7.
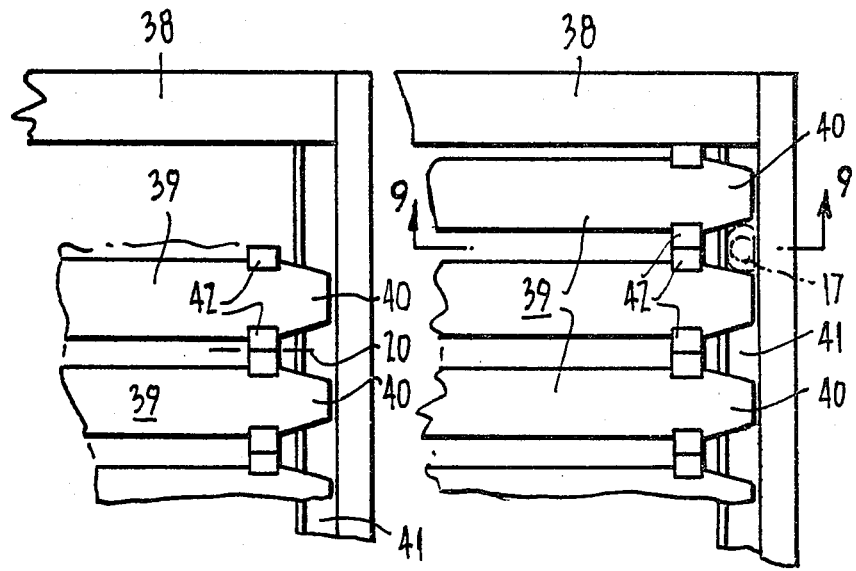
FIG. 10.
FIG. 8.
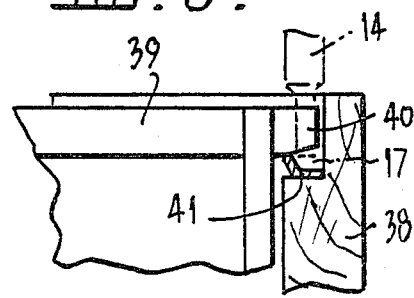
FIG. 9.

APPARATUS FOR SEPARATING BEEHIVE BOXES

This invention relates to an apparatus for separating beehive boxes, or supers as they are known in the trade, from a stack of superimposed boxes having a lid member and forming a hive.

Beehives are generally of rectangular shape, formed from a stack of rectangular boxes or supers, and provided with a lid and a supporting pedestal. The boxes contain the honey frames which are detachably located therein.

Waxing between the boxes, due to and as a result of the formation of the honey frames, makes it extremely difficult to remove, by lifting, a box for inspection of the frames or collection of honey from the frames without disturbing and distorting the frames of the next lower box. Up to the present time many tools and implements, such as screw drivers, scraper knives, even garden spades, have been used to separate the boxes by a prising or lifting action at the edges of the boxes. However these methods usually displace and damage the honey frames in the removed box and also the lower box.

It is an object of the present invention to provide an apparatus which will break the wax seal between superimposed boxes and move the top box with a sliding shearing action with minimum disturbance to the honey frames of the removed and at least the next lower box, and also to the bees in the hive.

It is a further object of the invention to provide a simple structure, easily located on the hive for operation, and with particular ease of operation.

According to the invention there is provided an apparatus for separating beehive boxes, comprising a rectangular framework adapted to fit over and engage between two superimposed beehive boxes, said framework comprising two spaced-apart side members connected at their ends by transverse members, said side members at one end thereof including pivotal link members having the transverse member attached between the outer ends of said link members, and handle means connected to said link members between their pivotal point and said transverse member, the transverse member at the other end of said side members being adapted to engage against one end of the top box, and the transverse member at the said one end being adapted to engage against the opposite end of the lower box, such that pivotal movement of said handle means slides said top box over said lower box to break the seal between the boxes.

Figure 5:
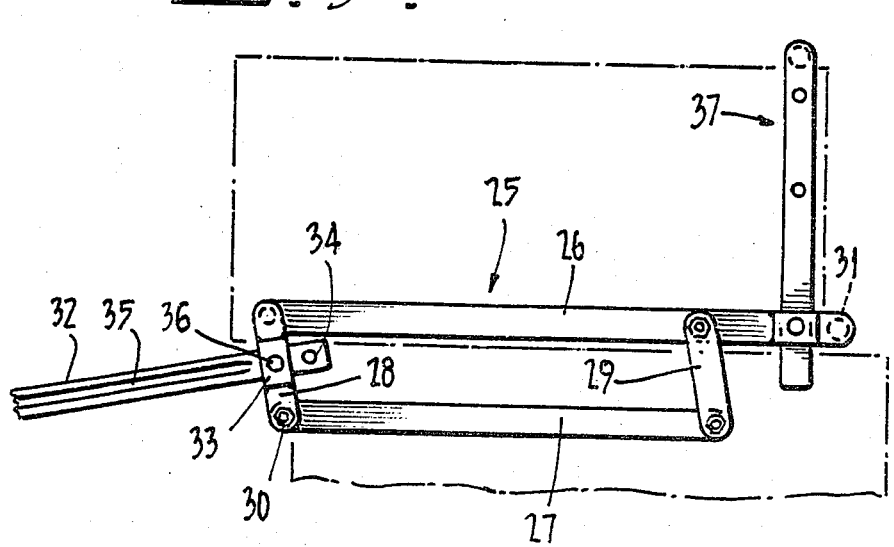
Figure 2:
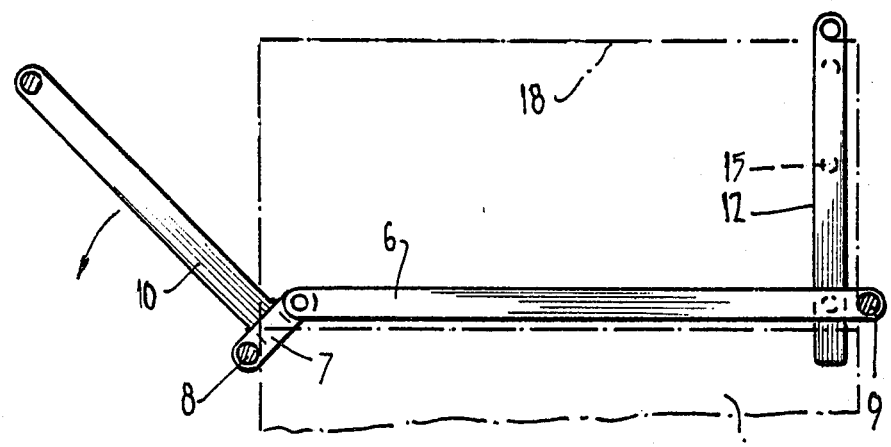
Figure 3:
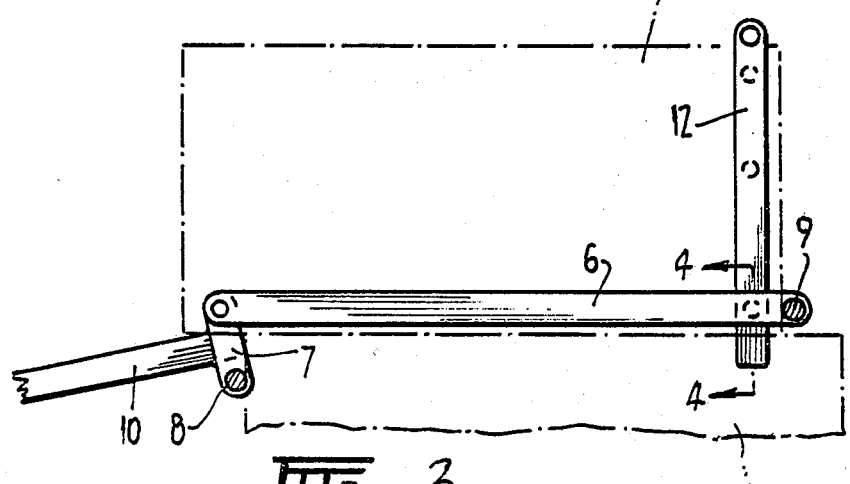
Figure 4:
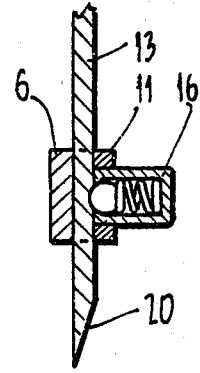

In order that the invention and its manner of performance may be more fully described, reference will now be made to an embodiment of the invention as illustrated in the accompanying drawings in which:

FIG. 1 is a perspective view of one embodiment of the invention,

FIG. 2 is a side elevational view along the line 2—2 of FIG. 1, of the apparatus located on a beehive, FIG. 3 is a side elevational view similar to FIG. 2 but showing the apparatus in its actuated position, FIG. 4 is a part-sectional view of an adjustably locating chisel bar member of the apparatus, FIG. 5 is a side elevational view of a second embodiment of the invention in its actuated position, FIG. 6 is a perspective view of a honey frame removing tool being part of the positioning member of FIGS. 1 and 5, FIG. 7 is a view of the chisel end of the positioning member, FIG. 8 is a part plan view of a beehive box showing the location of the honey frames therein, FIG. 9 is a part sectional side view along the line 9—9 of FIG. 8 showing the mode of removal of an end frame from a box, and FIG. 10 is a plan view of a box showing the end honey frame removed and the location of the chisel bar member when sideways separating frames in a box.

Referring to FIGS. 1 to 4 and 6, the framework 5 comprises side members 6 and side link members 7 pivotally attached to members 6 at one end thereof. A transversely extending bar or roller member 8 is attached between the outer ends of link members 7 at said one end, and at the other end the side members 6 have a similar bar or roller member 9 attached therebetween.

A handle member 10 is fixedly attached to and extends substantially normal to the link members 7. Adjacent the other end of side members 6 there are provided sockets 11 for adjustably locating positioning members 12. Each positioning member 12 comprises a bar 13 having a spigot, pin or bar part 14 extending from one end at a right angle thereto. Bar 13 is provided with indentations or apertures 15 for engagement by a spring loaded detent member 16 located on socket 11 so as to releasably lock said bar 13 in a number of locations relative to side members 6. Spigot part 14 is provided at its outer free end with a key 17 and bar 13 is provided with a chisel edge 20 for purposes as will hereinafter be described.

Beehives comprise a number of superimposed boxes which may include a half size box or boxes and a lid. With the lid removed, the apparatus is positioned over the top box 18 with spigot parts 14 of positioning members 12 resting on top of the box 18 and adjusted in length so that bar member 9 engages against an end of the top box 18 adjacent the bottom thereof. Handle member 10 is positioned so that bar member 8 engages against the opposite end of the next lower box 19 adjacent the top thereof as clearly shown in FIG. 2. Resilient sleeves 21 on bar members 8 and 9 serve to ensure positive engagement of both sides of a box end, particularly when the ends of the boxes, through extended use, become bowed outwardly in the middle, or when centrally located catch members are provided between boxes for locating purposes when the hive is set up.

As shown in FIG. 3, downward actuation of handle member 10 moves box 18 across the top of box 19 with a shearing action to effectively and cleanly separate the two boxes 18 and 19 with a minimum of disturbance to the honey frames of the boxes 18 and 19. Box 18 can now be lifted off the hive with its honey frames intact, after handle member 10 has been moved upwardly so as to allow the apparatus to be removed. When the apparatus is not in use, handle member 10 can be hinged inwardly onto side members 6 to provide smaller storage and carrying space.

Removal of the lid (not shown) can be achieved by so locating positioning members 12 that bar member 9 engages against the end of the lid whilst bar member 8 engages against the end of the top box. Similarly when half boxes are used in the hive, the positioning means can be adjusted accordingly.

Referring to FIG. 5 there is shown another embodiment of the apparatus of the invention wherein the framework 25 includes upper and lower side members 26 and 27 pivotally connected to link members 28 and 29 to form parallelogram structures. Bar member 30 is connected between one end of side members 27 and bar member 31 is connected between the outer free ends of side member 26.

Handle member 32 is connected to link member 28 through a socket 33 and is provided with indentations 34 at each end thereof and a groove 35 extending between the ends. Socket 33 includes a spring loaded detent member 36 engageable with handle member 32 to allow movement of the handle member 32 between an extended operating position and an inner non-extended position for carrying purposes. Groove 35 accommodates detent 36 so as to allow ease of movement of handle member 32 between its several positions. Positioning member 37 is similar to positioning member 12 of the previously described embodiment.

The operation of the apparatus of FIG. 5 is similar to that described with reference to FIGS. 2 and 3.

Referring to FIGS. 7 to 10 there is illustrated a box 38 showing honey frames 39 located side-by-side therein and resting at their ends 40 on a rail 41. The frames 39 incorporate spacers 42 to allow freedom of movement for the bees between the frames and to prevent solidifying of the frames in the box. The frames 39 extend longitudinally in the box in the direction of movement during separation of the boxes to ensure clean separation with minimum disturbance to the frames 39.

When it is desired to remove the frames 39 to collect the honey, an end frame is lifted up by inserting key 17 of the positioning members 12 (removed from the apparatus) into the rail 41 under each end of the frame and the frame is levered upwardly and removed. This allows sufficient space to separate the remaining frames for removal with minimum disturbance and damage to the bees on the frames. To separate the remaining frames the chisel edge 20 of positioning member 12 is inserted between spacers 42 and one-by-one the frames are prised apart for ease of removal. After removal the frames are shaken so that the bees drop off in front of the entrance to the hive, at the bottom thereof, from where they will again enter the hive.

In the event that the boxes are so solidly fused together that use of the apparatus of the invention is not physically feasable, the chisel edge 20 of bar 13 of the positioning members can be inserted transversely between boxes adjacent their ends and the bars 13 pushed in between the boxes. A twisting action on bars 13 will lift the top box sufficient to break the seal and at the same time hold down the frames in the lower box. The top box may then be removed or the apparatus of the invention can then be used to ensure clean separation.

Beehives are usually of 8, 10 or 12 frame box capacity and it will be appreciated that this variation in width of boxes can be easily met by substituting transverse bar members and handle members of the desired length.

We claim:

1. Apparatus for separating beehive boxes, comprising a rectangular framework adapted to fit over and engage between two superimposed beehive boxes, said framework comprising two spaced-apart side members connected at their ends by transverse members, said side members at one end thereof including pivotal link members having the transverse member attached between the outer ends of said link members, and handle means connected to said link members between their pivotal point and said transverse member, the transverse member at the other end of said side members being adapted to engage against one end of the top box, and the transverse member at the said one end being adapted to engage against the opposite end of the lower box, such that pivotal movement of said handle means slides said top box over said lower box to break the seal between the boxes.

2. An apparatus according to claim 1 and including vertically adjustable positioning members attached to and extending above and inwardly of said side members adjacent the other end thereof, said positioning members being adapted to engage above and over the sides of the top box.

3. An apparatus according to claim 2 wherein said positioning members comprise bar members having a chisel edge at one end for separating honey frames in said boxes and a transversely extending member at the other end for engaging over and against the top of the said top box.

4. An apparatus according to claim 3 wherein said transversely extending members are provided with key means at their outer free ends for engaging under the ends of honey frames in said boxes so as to loosen same.

5. An apparatus according to claim 3 or claim 4 wherein said positioning members are accommodated in sockets on said side members and wherein said sockets are provided with means for adjustably locating said positioning members in relation to said side members.

6. An apparatus according to claim 5 wherein the locating means comprises spring loaded detent means engageable in indentations in said positioning members.

7. An apparatus according to claim 1 or claim 2 wherein each side member comprises pivotal link members forming a parallelogram.

8. An apparatus according to claim 1 or claim 2 wherein each side member comprises a single bar member having a pivotal link member attached thereto at said one end thereof.

9. An apparatus according to claim 1 or claim 2 wherein said handle means are adjustably connected to said link members for sliding movement between an extended operating position and non-extended carrying position.

* * * * *